(12) United States Patent
Fernandez Orellana et al.

(10) Patent No.: US 10,979,677 B2
(45) Date of Patent: Apr. 13, 2021

(54) IMAGE-BASED EVENT NOTIFICATION SYSTEM

(71) Applicant: Carrier Corporation, Palm Beach Gardens, FL (US)

(72) Inventors: Pedro Fernandez Orellana, Cork (IE); Ankit Tiwari, South Windsor, CT (US); Hector Moner Poy, Cork (IE); Daniele Campana, Cork (IE); Michael Ramoutar, Westford, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/493,682

(22) PCT Filed: Mar. 15, 2018

(86) PCT No.: PCT/US2018/022537
§ 371 (c)(1),
(2) Date: Sep. 12, 2019

(87) PCT Pub. No.: WO2018/170193
PCT Pub. Date: Sep. 20, 2018

(65) Prior Publication Data
US 2020/0137358 A1    Apr. 30, 2020

Related U.S. Application Data

(60) Provisional application No. 62/471,468, filed on Mar. 15, 2017.

(51) Int. Cl.
*H04N 7/18*    (2006.01)
*H04N 5/232*   (2006.01)
(Continued)

(52) U.S. Cl.
CPC ............. *H04N 7/185* (2013.01); *G06F 9/542* (2013.01); *H04L 67/125* (2013.01);
(Continued)

(58) Field of Classification Search
CPC ............. G06F 9/542; G08B 13/19684; G08B 13/19686; G08B 13/19691;
(Continued)

(56) References Cited

U.S. PATENT DOCUMENTS 7,679,507 B2    3/2010  Babich et al.
2007/0296817 A1* 12/2007 Ebrahimi ......... G08B 13/19686
                                                    348/161
(Continued)

FOREIGN PATENT DOCUMENTS

WO    2006006081 A2    1/2006
WO    2014109864 A1    7/2014

OTHER PUBLICATIONS

ISR for Application No. PCT/US2018/022537 dated Jul. 2, 2018; 5 pages.
(Continued)

*Primary Examiner* — Sisay Yacob
(74) *Attorney, Agent, or Firm* — Cantor Colburn LLP

(57) ABSTRACT

An image-based event notification system includes a detection device, a controller, and a user application. The detection device is configured to generate an image. The controller is configured to receive the image and output an associated event-based image indicative of an event. The user application includes a user interface and a display. The user application is configured to receive the event-based image from the controller, and display the event-based image on the display. From the display, a user may choose between a user event confirmation and a user event rejection.

19 Claims, 4 Drawing Sheets

(51) Int. Cl.
*H04N 5/33* (2006.01)
*G06F 9/54* (2006.01)
*H04L 29/08* (2006.01)

(52) U.S. Cl.
CPC ........... *H04N 5/23206* (2013.01); *H04N 5/33* (2013.01); *H04N 7/188* (2013.01)

(58) Field of Classification Search
CPC ............ G08B 13/19695; G08B 25/001; H04L 67/125; H04N 5/23206; H04N 5/33; H04N 7/185; H04N 7/188
See application file for complete search history.

(56) References Cited

U.S. PATENT DOCUMENTS

| | | | | |
|---|---|---|---|---|
| 2008/0284580 | A1* | 11/2008 | Babich | G08B 13/19697 340/502 |
| 2009/0175612 | A1* | 7/2009 | Wen | G03B 15/03 396/155 |
| 2012/0105632 | A1* | 5/2012 | Renkis | G08B 13/19619 348/143 |
| 2014/0197959 | A1* | 7/2014 | Tarmey | G08B 25/14 340/691.6 |
| 2017/0293950 | A1* | 10/2017 | Rathod | G06Q 30/0639 |

OTHER PUBLICATIONS

Written Opinion for Application No. PCT/US2018/022537 dated Jul. 2, 2018; 9 pages.

* cited by examiner

IMAGE-BASED EVENT NOTIFICATION SYSTEM

CROSS-REFERENCE TO RELATED APPLICATIONS

This is a National Stage Application of PCT/US2018/022537 filed Mar. 15, 2018 which claims priority to U.S. Provisional Application No. 62/471,468 filed Mar. 15, 2017, both of which are incorporated herein by reference in their entirety.

BACKGROUND

The present disclosure relates to an image-based event notification system, and more particularly, to an image-based event notification system with user event verification capability.

Known residential and commercial security and/or safety systems may share a common issue of false notifications (e.g., alarms). Such false notifications may result from human or system errors, and the system may lack any ability to verify the notification as authentic or false. Such verification is desirable before the system deploys actions based on what may be a false notification. Moreover notification verification should be robust, streamlined, and relatively inexpensive.

In addition, for image-based systems, event-based images may be sent to multiple parties utilizing multiple devices or stations. Especially for false notifications, users of the image-based event notification system may be deprived of desired privacy.

SUMMARY

An image-based event notification system according to one, non-limiting, embodiment of the present disclosure includes a device configured to generate an image; a sensor configured to generate an event; a controller configured to receive the image when an event is generated by the sensor and output an associated event-based image indicative of an event; and a user application including a user interface and a display, wherein the user application is configured to receive the event-based image from the controller, and display the event-based image on the display for a user to choose between a user event confirmation and a user event rejection.

Additionally to the foregoing embodiment, the device comprises the sensor.

In the alternative or additionally thereto, in the foregoing embodiment, the image-based event notification system includes a monitoring station configured to receive the user event confirmation from the user application and take an action indicative of the event, wherein if the user chooses the user event rejection the event is cancelled.

In the alternative or additionally thereto, in the foregoing embodiment, the controller is configured to detect the event based on the image as one of a plurality of images received from the detection device.

In the alternative or additionally thereto, in the foregoing embodiment, the user application is configured to send the event-based image to the monitoring station with the user event confirmation.

In the alternative or additionally thereto, in the foregoing embodiment, the image is an event-based image comprising a plurality of images.

In the alternative or additionally thereto, in the foregoing embodiment, the device includes a motion sensor and a camera, the motion sensor is configured to detect motion and trigger the event, and upon the event, the camera is configured to generate the image.

In the alternative or additionally thereto, in the foregoing embodiment, the detection device is a passive infrared camera (PIRCam).

In the alternative or additionally thereto, in the foregoing embodiment, the controller is configured to store the image.

In the alternative or additionally thereto, in the foregoing embodiment, the controller is a cloud server and the device is a wireless device.

In the alternative or additionally thereto, in the foregoing embodiment, the controller is a cloud server.

In the alternative or additionally thereto, in the foregoing embodiment, the image is strategically overlayed upon a preprogrammed scene.

In the alternative or additionally thereto, in the foregoing embodiment, the scene is a building floor plan.

In the alternative or additionally thereto, in the foregoing embodiment, the image-based event notification system includes a timer associated with a timeout duration, wherein the timer is configured to start when the image is sent to the user application by the controller, stop upon generation of the user event confirmation or the user event rejection, and expire the timeout duration if neither of the user event confirmation and the user event rejection is generated whereupon the user application is configured to send an automated event confirmation to the monitoring station.

In the alternative or additionally thereto, in the foregoing embodiment, the timer is part of the controller.

In the alternative or additionally thereto, in the foregoing embodiment, the user application is a mobile application.

In the alternative or additionally thereto, in the foregoing embodiment, one of the device, the controller, and the user application is configured to modify the image for privacy.

In the alternative or additionally thereto, in the foregoing embodiment, modifying the image is facilitated by blurring the image.

In the alternative or additionally thereto, in the foregoing embodiment, the user application is configured to un-modify the image upon user selection.

An image-based security system according to another, non-limiting, embodiment includes a detection device configured to generate an alarm-based image indicative of a detected alarm event; a controller configured to receive the alarm-based image, modify the alarm-based image for privacy, and output a modified alarm-based image; a user application including a user interface and a display, wherein the mobile application is configured to receive the modified alarm-based image from the controller, display the modified alarm-based image on the display, facilitate a user selection to un-modify the modified alarm-based image, and output at least the modified alarm-based image; and a monitoring station configured to receive the modified alarm-based image.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
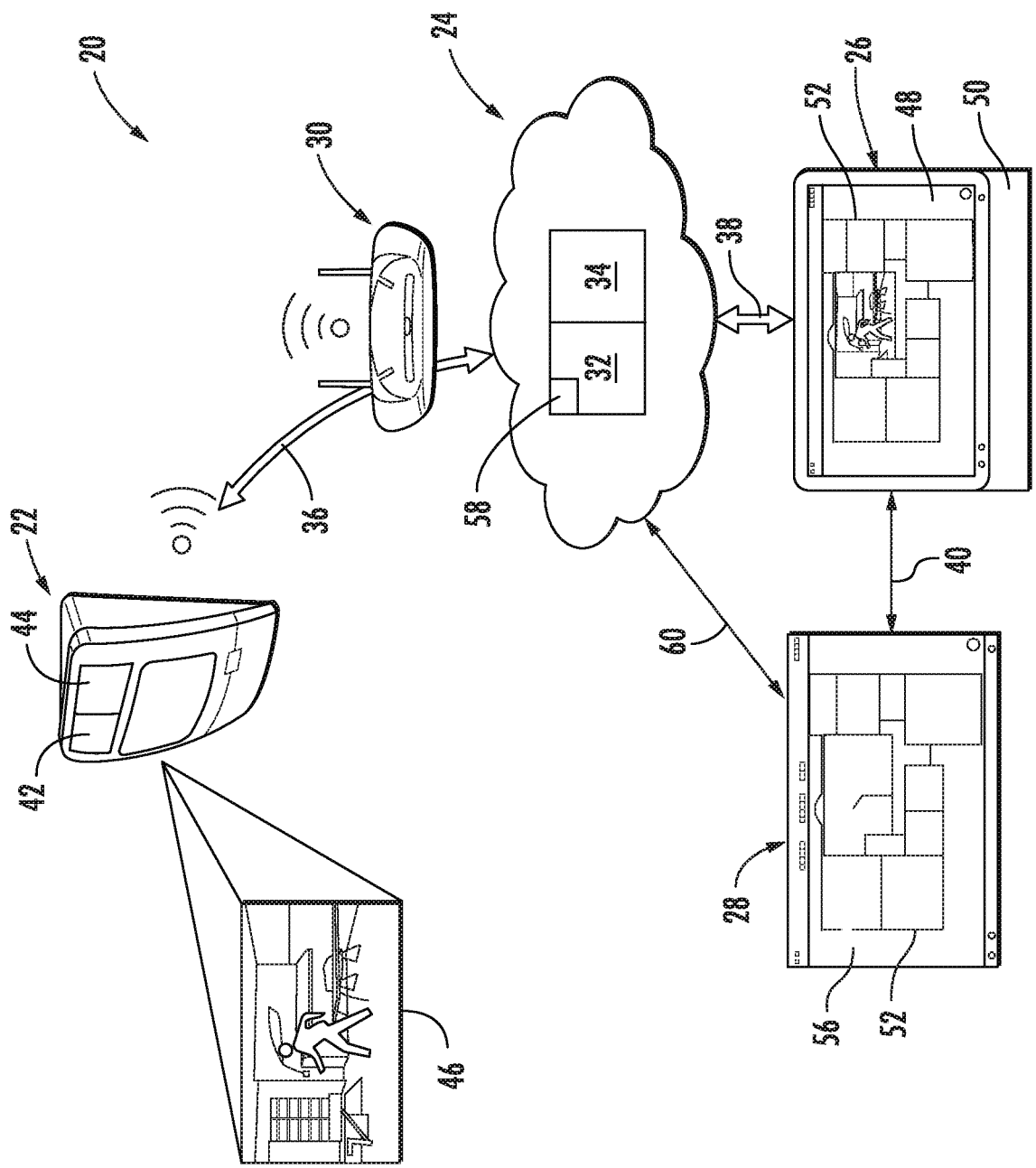
FIG. 1 is a schematic of an image-based event notification system as one, non-limiting, exemplary embodiment of the present disclosure.

Referring to FIG. 1, an exemplary embodiment of an image-based event notification system 20 that may be wireless is illustrated. The image-based event notification system 20 may include a detection device 22, a controller 24, a user application 26, and a monitoring station 28. The controller 24 may be a cloud-based server, the detection device 22 may be wireless, and the image-based event notification system 20 may further include an Access Point (AP), or gateway, device 30 that may be a router (e.g., part of a Wi-Fi network). The controller 24 may include a computing processor 32 and a computer writeable and readable storage medium 34.

The detection device 22 and the controller 24 may be configured to communicate with one-another over a pathway (see arrow 36), which may be wireless and generally managed via the AP device 30. The user application 26 and the controller 24 may be configured to communicate with one-another over a pathway (see arrow 38). In one embodiment, the user application 26 may be a mobile application, and the pathway 38 may be a wireless pathway. The user application 26 and the monitoring station 28 may be configured to communicate with one-another over a pathway (see arrow 40) that may be wireless.

The image-based event notification system 20 may be any system constructed and arranged to detect an event and provide notification of the event once detected. Examples of such a system include a security system, a safety system, and others. The detection device 22 may be a wireless device configured to communicate with the processor 32 of the controller 24 through the AP device 30. In one embodiment, the detection device 22 may be configured to operate in a Wi-Fi Power Save Mode (PSM), may be an Internet of Things (IoT) device, and/or may be a smart device.

Non-limiting examples of the detection device 22, may include multi-functional devices that include a sensor 42 constructed and arranged to detect a potential event (i.e., an alarm event or any event worthy of notification), and an imaging device 44 that may take an event-based image 46 (e.g., alarm-based image). The event-based image 46 may be a single image, a series of images, or a video of the detected alarm event. The event-based image 46 may be sent to the controller 24 for processing by the processor 32 and retrievable storage in the medium 34. In one example, the detection device 22 may be a passive infrared camera (PIRCam). The sensor 42 may be any variety of sensors capable of detecting the presence of an intruder (e.g., human, animal, etc.) or other event (smoke, fire, etc.), and may be constructed an arranged to detect the intruder through motion, sound, heat signatures, and other means. In an alternative embodiment, the detection device 22 may be constructed and arranged to take a series of images, and the computing processor of the controller 24 may be configured to detect an event through the event-based images 46.

Figure 2:
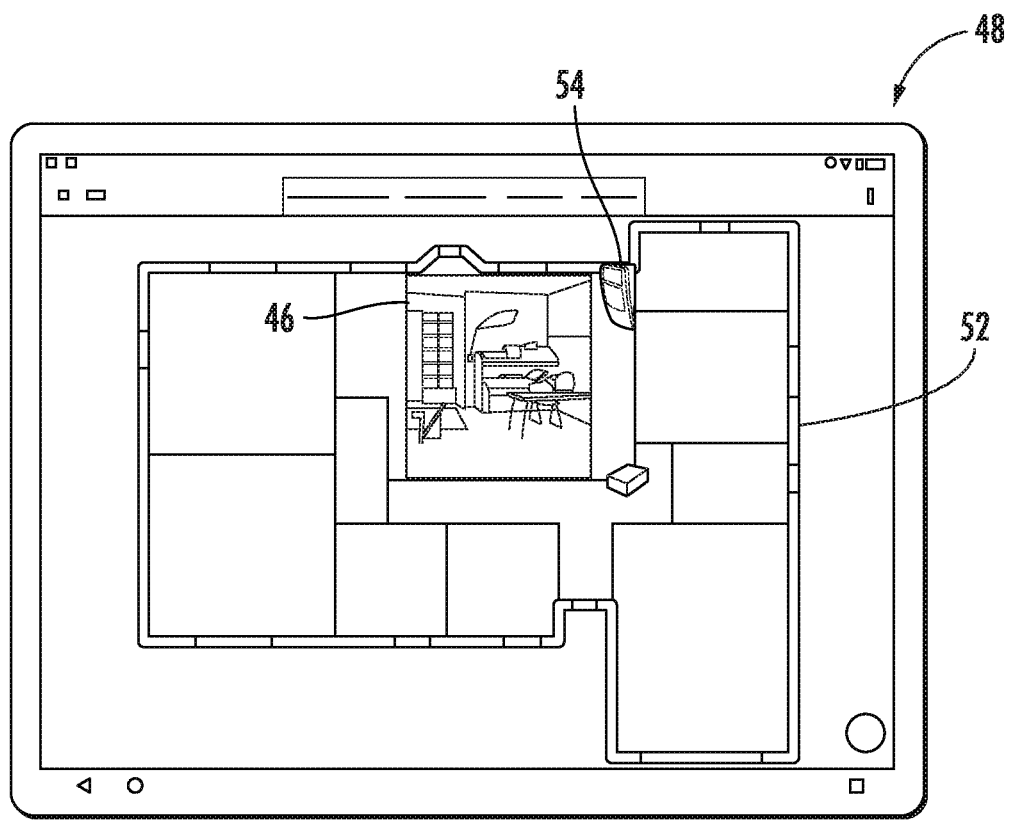
FIG. 2 is a front view of a display of a user application illustrating an event-based image of the image-based event notification system.

Referring to FIGS. 1 and 2, the user application 26 may include a user interface 48 and a display 50. The display 50 may facilitate the display of a pre-programmed scene 52 that may be a floor plan of a building. The alarm-based image 46 may be strategically overlayed upon the scene for viewing by a user. The scene 52 may further include a graphic portrayal 54 of the detection device 22 location within the associated room depicted in the scene 52. For example, an image 46 of an intruder may be displayed within the confines of an associated room outlined as part of the floor plan 52. In this way, the user of the user application 26 may know the location of the intruder. The scene in one embodiment the display 50 may be an interactive screen thus supporting the user interface 48 function. In one embodiment, the user application 26 may be a mobile application, and may further be a smartphone. Other non-limiting examples of a mobile application 26 may include a digital media player and a tablet computer.

Similar to the user application 26, the monitoring station 28 may include a display 56 configured to display the scene 52, and the alarm-based image 46 if confirmed by the user of the user application 26. If the monitoring station 28 receives a confirmed alarm event, the station 28 may be constructed and arranged to take an action in response to the alarm event. The monitoring station 28 may be located in a law enforcement facility, a remote building, or any other location capable of providing support to facilitate the responsive action.

Figure 3:
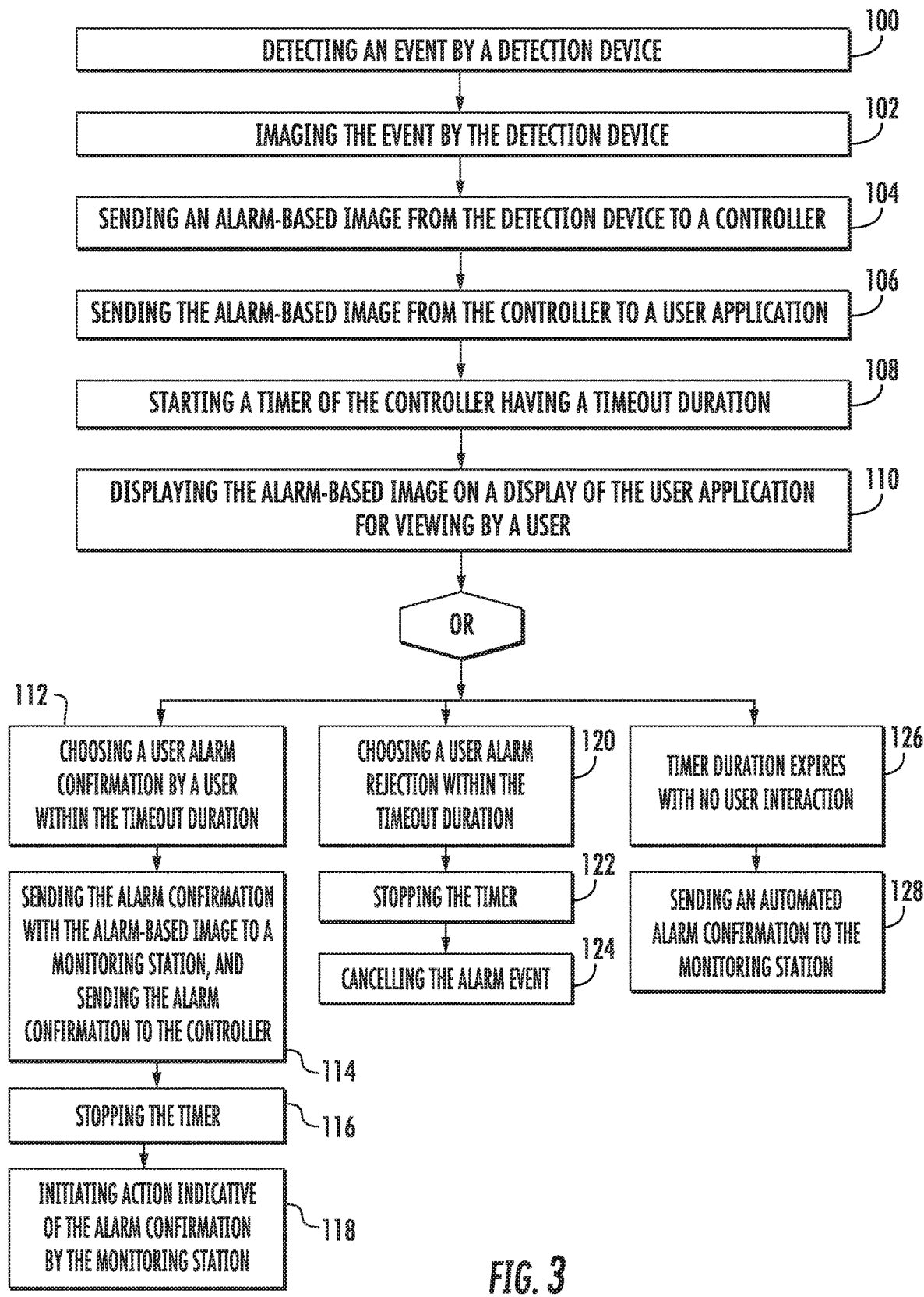
FIG. 3 is a flow chart of a method of operating the image-based event notification system.

Referring to FIG. 3, a method of operating the event notification system 20 is illustrated. At block 100, an alarm event may be detected by the sensor 42 of the detection device 22. At block 102, the event may be imaged (i.e., the alarm-based image 46) by the imaging device 44 of the detection device 22. At block 104, at least the alarm-based image 46 may be sent to the controller 24 over pathway 36. At block 106, the alarm-based image 46 may be sent from the controller to the user application 26 over pathway 38. At block 108, a timer 58 of the controller 24 (see FIG. 1) may be initiated. The timer 58 may include a pre-programmed timeout duration.

At block 110, the alarm-based image 46 may be displayed on the display 48 of the user application 26 for visual confirmation by a user, wherein the user may select from a user event confirmation (e.g., user alarm confirmation) and a user event rejection (e.g., user alarm rejection). In one embodiment, the event notification system 20 may also react in a scenario where no alarm verification is conducted by the user (i.e., the alarm-based image 46 is ignored by the user of the user application 26 and/or the image fails to reach the user application). In one of the three scenarios, and at block 112, the user chooses the user alarm confirmation within the timeout duration of the timer 58. At block 114, the alarm confirmation is sent from the user application 26 to the monitoring station 28 over pathway 40. Furthermore, the alarm confirmation (i.e., or signal indicative of the alarm confirmation) may be sent to the controller 24 over pathway 38. At block 116, the timer is stopped by the controller 24 upon receipt of the alarm confirmation, and may also command actions to various deployed actuators (e.g., a command to enable a siren). At block 118, the monitoring station 28 initiates an action indicative of the alarm-based image 46. For example, if the monitoring station 28 is located in a law enforcement facility, the station may initiate an action that results in sending a patrol car to a home associated with a detected intrusion.

In the second scenario, and at block 120, the user may select a user alarm rejection after viewing the alarm-based image 46 on the display 48 of the user application 26, and within the timeout duration of the timer 58. Similar to the first scenario, the user alarm rejection is sent to the controller 24 over pathway 38, but not necessarily to the monitoring station 28. At block 122 and upon receipt of the user alarm rejection, the controller 24 may stop the timer. At block 124, the controller 24 may cancel the alarm event.

In the third scenario, and at block 126, no action is taken by the user for any number of reasons/causes, and the timeout duration of the timer 58 expires (i.e., the controller 24 does not receive a user alarm confirmation or a user alarm rejection). At block 128, the controller 24 may send an automated alarm confirmation to the monitoring station 28 over a pathway 60 (see FIG. 1) that may be wireless. In one embodiment, the system behavior as a result of a timeout expiration may be predefined by a user. Such predefined behaviors may include: ignore alarm if timeout; confirm alarm if timeout; send picture (i.e., blurred or unblurred) to monitoring station to let personnel at the station decide on whether to verify or ignore; and/or, call the user.

Figure 4:
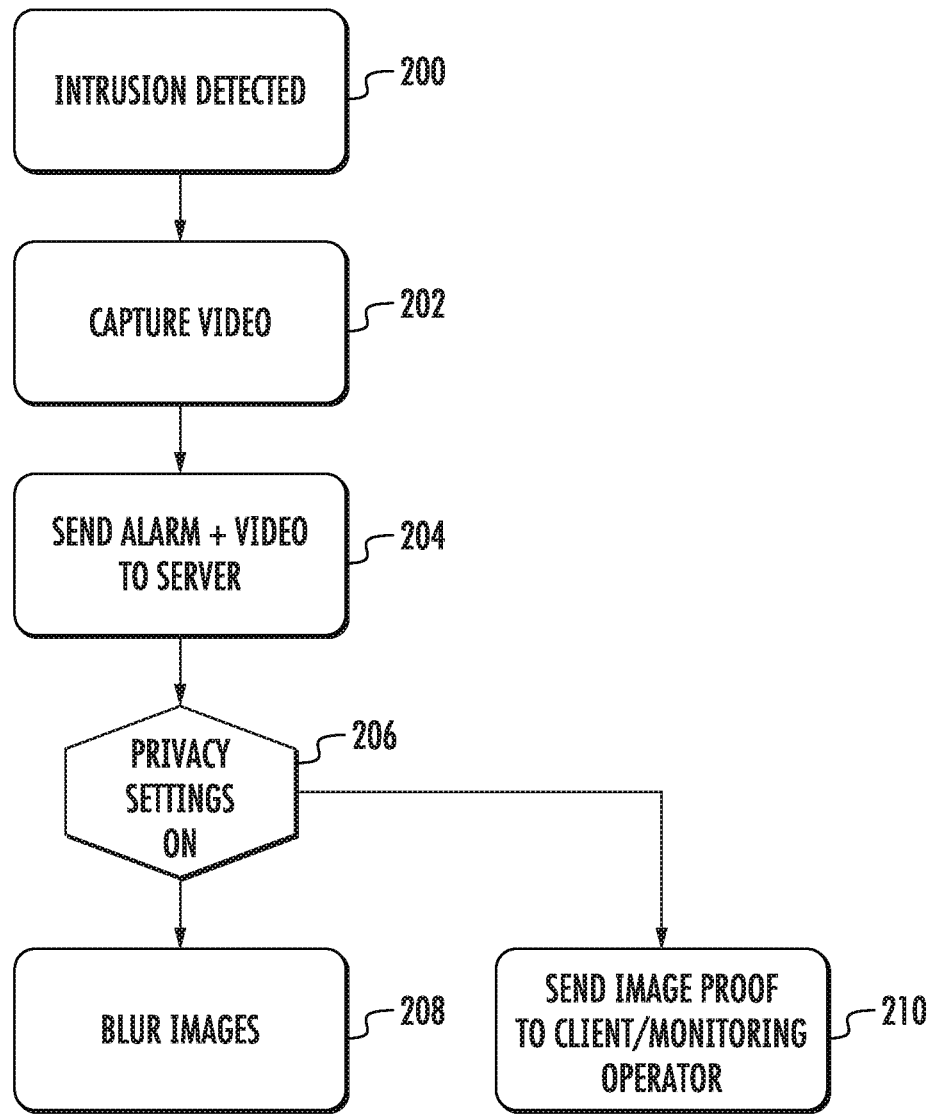
FIG. 4 is a flow chart of a method of blurring the event-based image generated by the image-based event notification system.

Referring to FIG. 4, an enhanced method of operating the event notification system 20 is illustrated. In block 200, an event (e.g., intrusion) may be detected by the sensor 42 of the detection device 22. In block 202, an alarm-based image 46 may be captured as a video by the imaging device 44 of the detection device 22. At block 204, the triggered event or alarm and the alarm-based image 46 may be sent to the controller 24 over pathway 36. At block 206, a privacy feature of the controller 24 may be selected to modify the alarm-based image 46. At block 208, the alarm-based image is modified to a modified alarm-based image for privacy reasons. One example of a modified alarm-based image may be the blurring of the image (i.e., applying a blurring mask). For example, viewing a blurred image may be sufficient to determine if a potential intruder is present, but not detailed enough to determine the identity of the potential intruder. At block 210, the modified alarm-based image is sent to the user application 26 and potentially the monitoring station 28. It is contemplated and understood that the user of the user application 26 and/or of the controller 24 may have the ability to un-modify the alarm-based image if a greater degree of confidence is desired to validate an alarm event.

Advantages and benefits of the present disclosure include a streamlined alarm verification process that adds value to event notification systems by reducing the impact of false alarms. Other advantages include a method to protect privacy with regard to, for example, intrusion systems wherein alarms may be verified, either by a user or by a third party. Because the blurring of the images may occur in the controller, logic embedded in imaging devices is not needed, thus reducing cost and complexity. Moreover, the burring filter or mask may still permit validation of a presence/ intruder despite the privacy settings being on, which may facilitate quick and efficient decisions made by monitoring individuals.

The various functions described above may be implemented or supported by a computer program that is formed from computer readable program codes, and that is embodied or stored in a computer readable storage medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An image-based event notification system comprising:
   a device configured to generate an image;
   a sensor configured to generate an event;
   a controller configured to receive the image when an event is generated by the sensor and output an associated event-based image indicative of an event; and
   a user application including a user interface and a display, wherein the user application is configured to receive the event-based image from the controller, and display the event-based image on the display for a user to choose between a user event confirmation and a user event rejection, wherein the user application is configured to send the event-based image to the monitoring station with the user event confirmation.

2. The image-based event notification system set forth in claim 1, wherein the device comprises the sensor.

3. The image-based event notification system set forth in claim 1, further comprising:
   a monitoring station configured to receive the user event confirmation from the user application and take an action indicative of the event, wherein if the user chooses the user event rejection the event is cancelled.

4. The image-based event notification system set forth in claim 1, wherein the controller is configured to detect the event based on the image as one of a plurality of images received from the detection device.

5. The image-based event notification system set forth in claim 1, wherein the image is an event-based image comprising a plurality of images.

6. The image-based event notification system set forth in claim 2, wherein the device includes a motion sensor and a camera, the motion sensor is configured to detect motion and trigger the event, and upon the event, the camera is configured to generate the image.

7. The image-based event notification system set forth in claim 6, wherein the detection device is a passive infrared camera (PIRCam).

8. The image-based event notification system set forth in claim 1, wherein the controller is configured to store the image.

9. The image-based event notification system set forth in claim 2, wherein the controller is a cloud server and the device is a wireless device.

10. The image-based event notification system set forth in claim 8, wherein the controller is a cloud server.

11. The image-based event notification system set forth in claim 1, wherein the image is strategically overlayed upon a preprogrammed scene.

12. The image-based event notification system set forth in claim 11, wherein the scene is a building floor plan.

13. The image-based event notification system set forth in claim 3, further comprising:
a timer associated with a timeout duration, wherein the timer is configured to start when the image is sent to the user application by the controller, stop upon generation of the user event confirmation or the user event rejection, and expire the timeout duration if neither of the user event confirmation and the user event rejection is generated whereupon the user application is configured to send an automated event confirmation to the monitoring station.

14. The image-based event notification system set forth in claim 13, wherein the timer is part of the controller.

15. The image-based event notification system set forth in claim 1, wherein the user application is a mobile application.

16. The image-based event notification system set forth in claim 1, wherein one of the device, the controller, and the user application is configured to modify the image for privacy.

17. The image-based event notification system set forth in claim 16, wherein modifying the image is facilitated by blurring the image.

18. The image-based security system set forth in claim 16, wherein the user application is configured to un-modify the image upon user selection.

19. An image-based security system comprising:
a detection device configured to generate an alarm-based image indicative of a detected alarm event;
a controller configured to receive the alarm-based image, modify the alarm-based image for privacy, and output a modified alarm-based image;
a mobile user application including a user interface and a display, wherein the mobile user application is configured to receive the modified alarm-based image from the controller, display the modified alarm-based image on the display, facilitate a user selection to un-modify the modified alarm-based image, and output at least the modified alarm-based image; and
a monitoring station configured to receive the modified alarm-based image.

* * * * *